United States Patent
Odachi et al.

(10) Patent No.: US 6,848,547 B1
(45) Date of Patent: Feb. 1, 2005

(54) NON-CONTACT ELECTRIC POWER SUPPLY SYSTEM FOR A RAIL-GUIDED VEHICLE

(75) Inventors: Yasuharu Odachi; Masaki Takasan; Katsuyuki Morita, all of Aichi (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/177,807

(22) Filed: Oct. 23, 1998

(30) Foreign Application Priority Data

Oct. 24, 1997 (JP) .............................. 9-292074

(51) Int. Cl.[7] .................................. B60L 9/00
(52) U.S. Cl. ................... 191/10; 191/12 R; 191/22 R; 104/130.06; 104/45
(58) Field of Search .............................. 104/35, 45, 48, 104/49, 96, 99, 102, 130.03, 130.06; 191/3, 6, 9, 10, 22 R, 12 R; 310/12, 13; 336/115, 125, 129

(56) References Cited

U.S. PATENT DOCUMENTS 5,619,078 A * 4/1997 Boys et al. .................. 191/10
5,898,579 A * 4/1999 Boys et al. .................. 191/10
5,938,151 A * 8/1999 Takasan et al. ............... 191/10

FOREIGN PATENT DOCUMENTS

| JP | 8-168195 | 6/1996 |
| JP | 9-93841 | 4/1997 |

* cited by examiner

*Primary Examiner*—Mark T. Le
(74) *Attorney, Agent, or Firm*—Morgan & Finnegan, LLP (57) ABSTRACT

A non-contact electric power supply system for a rail-guided vehicle includes a main line having fixed rails for guiding the vehicle. A movable rail body is provided for changing the course of the vehicle moving along the main line. A first high frequency power supply apparatus supplies electric power to the main line along an electric feed line. A second high frequency power supply apparatus supplies electric power to the movable rail body along an electric feed line. Portions of the electric feed line on the movable rail body may be fixed in place.

18 Claims, 5 Drawing Sheets

NON-CONTACT ELECTRIC POWER SUPPLY SYSTEM FOR A RAIL-GUIDED VEHICLE

BACKGROUND OF THE INVENTION

1. Field of the Invention

The present invention relates to a non-contact electric power supply system for movable sections for a rail-guided vehicle. More specifically, the present invention relates to the configuration of a non-contact electric power supply system for the stable supply of electric power to a lateral table and a turntable for a rail-guided vehicle.

2. Description of the Related Art

An electric feed cable secured to a rail on a main line, which itself ordinarily is fixed in place, and an electric feed line provided at a branch point, a rotating body, and similar movable bodies in a conventional non-contact electric power supply system are connected to form one loop among all electric feed lines by means of a connecting line connecting the main line and the movable bodies.

Figure 1:
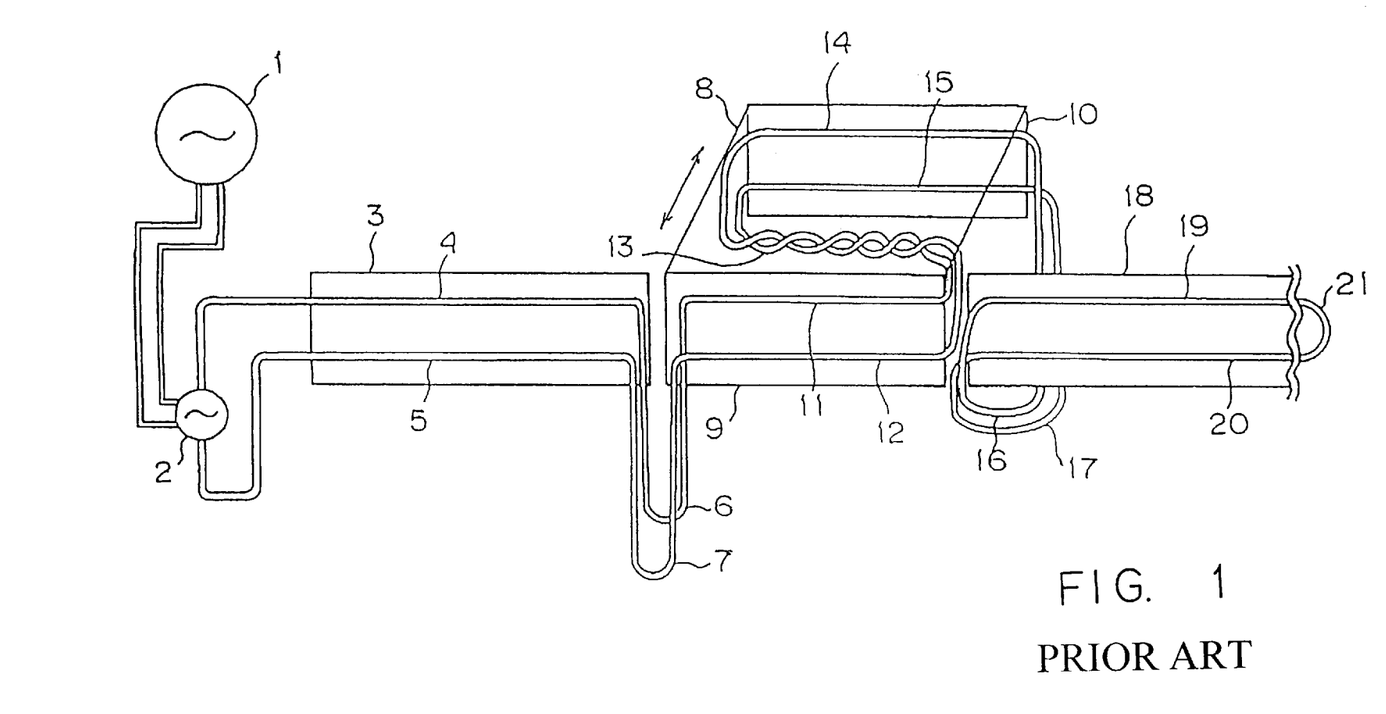
FIG. 1 discloses the overall configuration of a conventional non-contact power supply system for a rail-guided vehicle.

The overall configuration of a non-contact electric power supply system for a rail-guided vehicle, as embodied in the related art, is hereunder explained, utilizing FIG. 1.

A commercial power supply 1 consists of a power source received from, illustratively, a power company, through a power line in 50/60 Hz, 200/100V, and 3-phase units.

A first high-frequency power supply apparatus 2 is a high-frequency power supply apparatus in which a frequency is set by an inverter or like device to 10 kHz, for example, and which is capable of supplying a fixed current in the order of 100 A.

A first fixed rail 3 regulates the direction of the vehicle's movement so that the movement does not deviate from the rail. The first fixed rail 3 also supports the weight of the vehicle and holds electric feed cables, which are hereinafter described.

Electric feed cables 4 and 5 are connected to the first high-frequency power supply apparatus 2. Fixed on the first fixed rail 3, the feeder cables 4 and 5 consist of litz lines or like power lines for supplying electric power to the vehicle without contact therewith. A litz line, as contemplated by the present invention, consists of approximately 100 enamel-coated wires twisted together and further insulated. The cross-sectional diameter of a whole line is about 15–20 mm, and the current capacity thereof is on the order of 100 A.

Transition lines 6 and 7 are litz lines or like power lines, possessed of some degree of slackness, that connect the feeder cables 4 and 5 on the first fixed rail 3 with the feeder cables on a lateral table 8 (described hereinafter) to permit movement of the lateral table.

The lateral table 8 changes tracks for the vehicle and can change the course thereof, or conduct the vehicle to a feeder line. To change rails, the vehicle is brought to a stop at a prescribed position, at which the vehicle rests completely on a first and a second movable rail 9 and 10 (described hereinafter) of the lateral table 8. A track change is accomplished as the lateral table 8 is displaced parallel to the second movable rails 9 and 10.

The first movable rail 9 and the second movable rail 10 are used to change tracks for the vehicle on the lateral table 8 and move in concert with the parallel displacement of lateral table 8. Electric feed cables 11 and 12, and 14 and 15, are connected to transition lines 6 and 7 and comprise litz lines or like power lines fixed respectively on the first movable rail 9 and the second movable rail 10.

A connecting line 13 is a cable connecting respectively electric feed cables 11 and 14, and 12 and 15, and consists of a litz line or like power line fixed in place on the lateral table 8.

Transition lines 16, 17 are litz lines or like power lines, possessed of some degree of slackness, that connect electric feed cables 14 and 15 on the lateral table 8 with electric feed cables 19 and 20 on a fixed rail 18 (described hereinafter), to permit displacement of the lateral table 8.

The second fixed rail 18 is, illustratively, a rail in a fixed track comprising a main line for the vehicle. The function of the second fixed rail 18 is, like that of the first fixed rail 3, to regulate the direction of the vehicle's movement so that the movement does not deviate from the rails. Additionally, the second fixed rail 18 supports the weight of the vehicle and holds electric feed cables (described hereinafter).

Electric feed cables 19 and 20 are connected to transition lines 16 and 17 and consist of litz lines or like power lines, fixed on the second fixed rail 18 and supplying electric power to the vehicle without contact therewith.

Short circuit line 21 is a litz line or like power line for short-circuiting the electric feed cables 19 and 20 at the ends thereof.

In the above-described non-contact power supply system, a rail-guided vehicle travels above the power feed lines and performs tasks while being supplied with power. When operating the vehicle under normal conditions, the lateral table 8 is displaced parallel to the fixed rail 3 and the second fixed rail 18 and is adjusted positionally so that the movable rail 9 is disposed in the same plane as the first fixed rail 3 and the second fixed rail 18. The vehicle travels sequentially from fixed rail 3 to movable rail 9, and from movable rail 9 to fixed rail 18. To change tracks for the vehicle, the lateral table 8 undergoes parallel displacement until the second movable rail 10 assumes the same position as the first movable rail 9. A vehicle that has traveled on first fixed rail 3 or second fixed rail 18, while being supplied with power from electric feed cables 4 and 5, or 19 and 20, is brought to rest at a prescribed position on the second movable rail 10 of the lateral table 8, at which position all wheels of the vehicle are on the second movable rail 10.

Then, the lateral table 8 undergoes further parallel displacement until the second movable rail 10 returns to its original position. In the case of a feeder line for, illustratively, a secondary line, the vehicles commences movement on the feeder line at the terminus of the vehicle's parallel displacement. If, however, the lateral table 8 coincides with, illustratively, a maintenance station, a vehicle that has been displaced to that location undergoes maintenance or assumes a standby posture.

To facilitate rail movement, however, it is necessary to provide the transition lines joining electric feed cables with some degree of slackness. Where rails are affixed to a ceiling, the slack regions of the transition lines inevitably hang down, thus interfering with work and rail traffic below. This effectively dilutes the purpose of fixing the rails to a ceiling and undermines the utilization efficiency at locations where rails are so fixed, as well as the efficiency of work crews performing tasks beneath those locations.

Further, because the respective distances between outbound and inbound electric feed cables and between hanging outbound and inbound lines fluctuate in regions where the transition lines are slack, the overall inductance of the electric feed cables varies significantly. A high-frequency supply source is unable to follow the pace of the inductance change in the electric feed cables, even where a source-side feedback control endeavors to compensate for the change in output. Consequently, power output fluctuates, and an unstable power supply is likely, particularly in the case of output reduction.

Because the diameter of an electric feed cable is a relatively large 15–20 mm, the cable cannot be bent sharply, but rather must be deflected gradually. It is thus necessary to provide the electric feed cables with a hanging distance greater than the minimum movement distance required by a movable body. Even where rails are fixed on a floor, the transition lines must enjoy some degree of slackness. The transition lines in this case require a wider range of motion than that required in a ceiling installation. In consequence thereof, the circumvention of the electric feed cables becomes difficult. If the floor is of metal construction, moreover, the likelihood of a further increase in inductance and attendant output reduction increases, given the resultant conductive heating and excessive current.

Further, if rails are installed in a clean room, installation of the rails and electric feed cables must be undertaken with an eye toward reducing to the greatest extent possible the number of movable bodies, in order to minimize the generation of particles. When installing successively the electric feed cables corresponding to the movable rails for, illustratively, the fixed rails and the lateral table, the transition lines must be slack, and the movement thereof harmonized with that of the movable rails.

SUMMARY OF THE INVENTION

A purpose of the present invention is to eliminate the transition lines between the above-described fixed rails and movable rails and to provide a non-contact electric power supply system in which feed line impedance is stabilized.

To this end, the present invention is divided into a first high-frequency supply source for use with the fixed rails and a second high-frequency supply source for use with the movable rails. Because the system is configured to fix in place the transition lines connecting the complementary fixed sections of rails that are disconnected at the rails' movable sections, the present invention reduces the output reduction due to abrupt inductance changes.

In addition to the fixed transition lines, the power lines extending from the second high-frequency supply source to a movable rail, also, are fixed in place, using a detached-type transformer. As a result, the present invention eliminates the output reduction resulting from abrupt changes in inductance.

Further, by having the power lines extending from the commercial supply source to the second high-frequency supply source utilize a detached-type transformer, and by fixing the second high-frequency supply source on the lateral table, the feeder lines are immobilized, thus eliminating the output reduction caused by abrupt changes in inductance. Installation is also simplified, because the gap in the detached-type transformer may be easily enlarged.

By winding the electric feed lines for the movable rails in multiple turns around a detached-type transformer, thinner lines can be used, thereby simplifying winding around and installation to the transformer cores.

DESCRIPTION OF THE PREFERRED EMBODIMENT

The preferred embodiment of the present invention is hereunder explained in detail, using the accompanying drawings.

Figure 2:
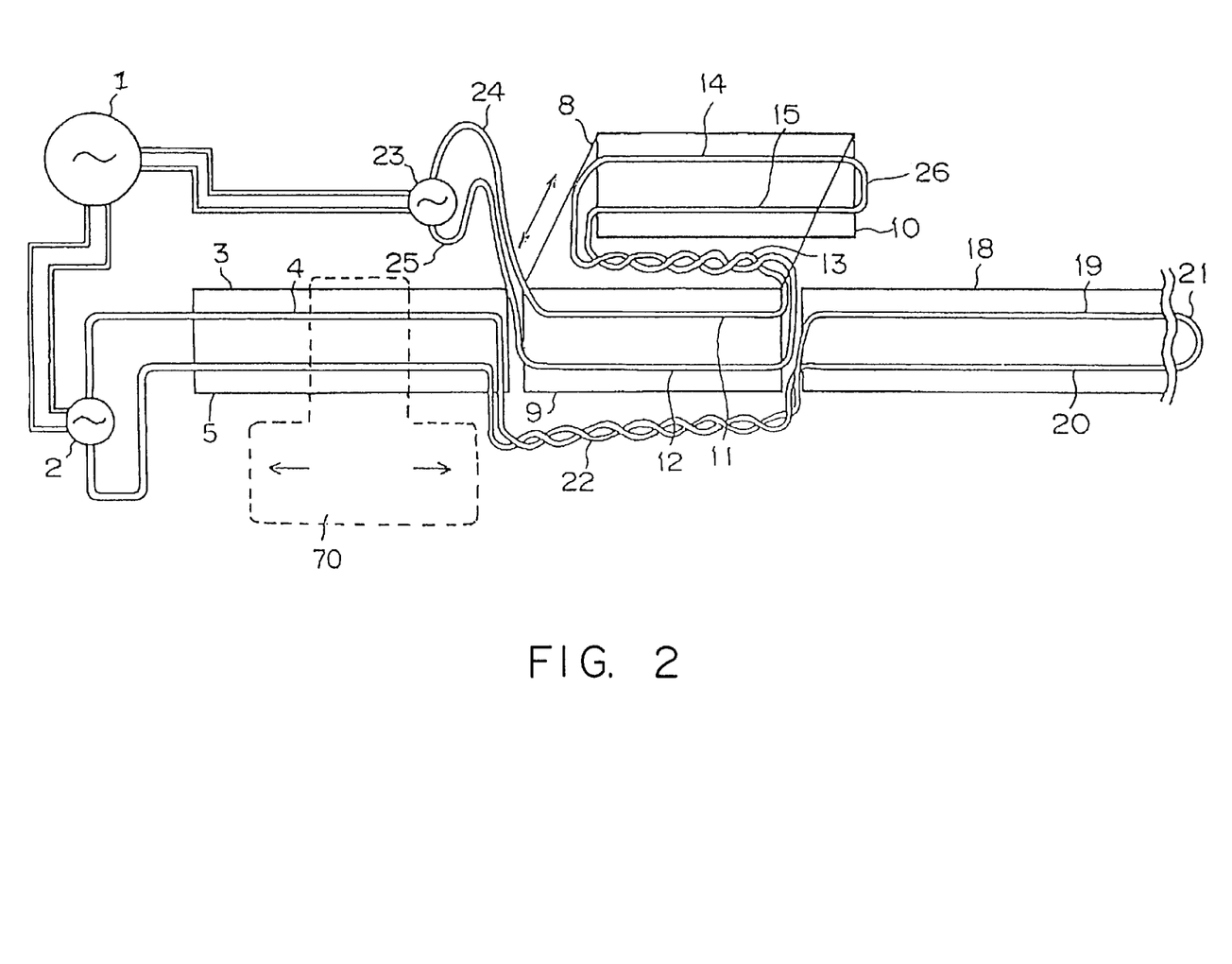
FIG. 2 discloses the overall configuration of the preferred embodiment of the non-contact power supply system for a rail-guided vehicle according to the present invention.

FIG. 2 discloses the overall configuration of the preferred embodiment of the present invention in a terminal platform for connecting established cables.

Items in FIG. 2 that appear in FIG. 1, also bear the same numbers assigned thereto. Any overlapping description is therefore omitted from the following explanation regarding FIG. 2.

Figure 3:
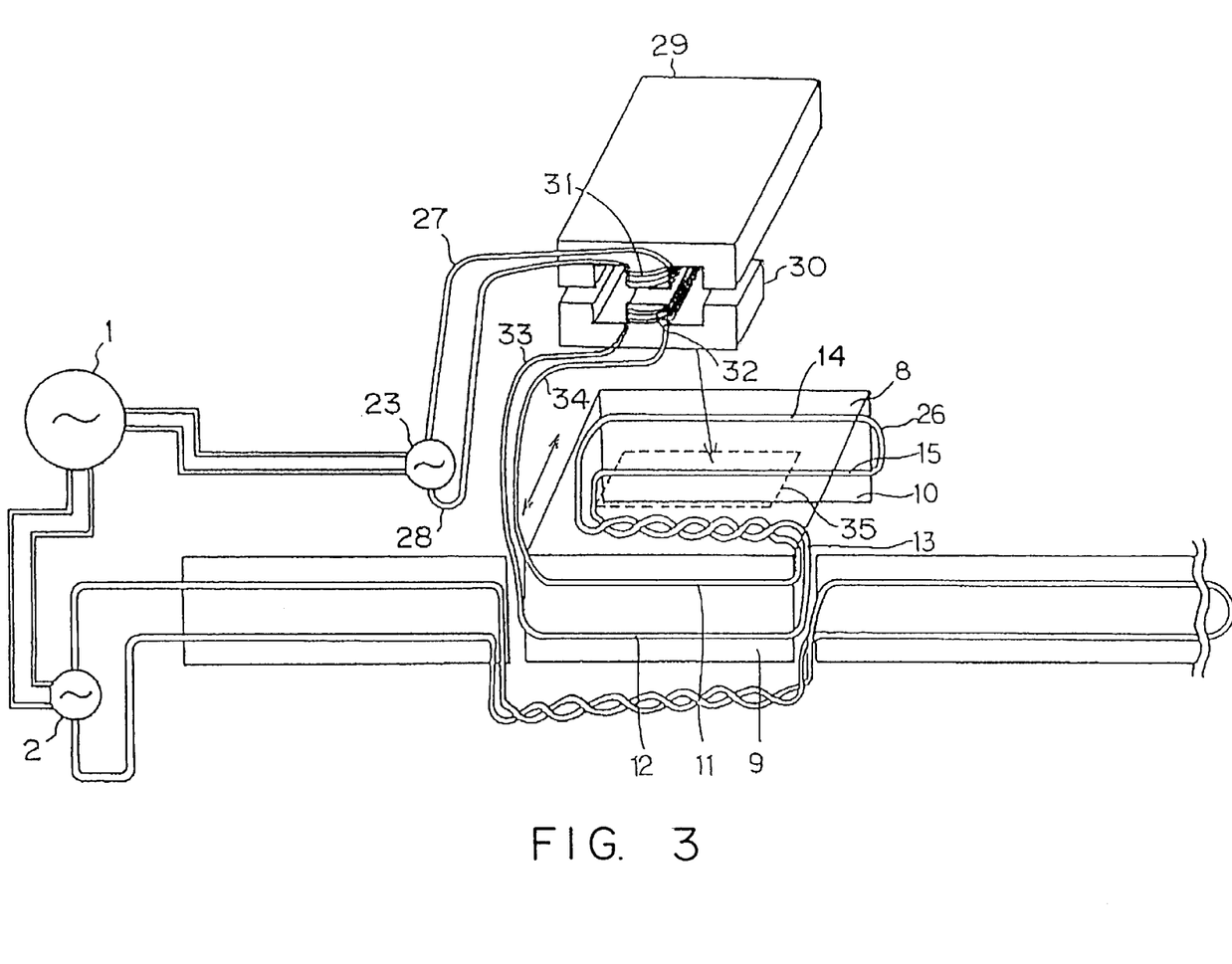
FIG. 3 discloses the overall configuration of a first alternative embodiment of the non-contact power supply system for a rail-guided vehicle according to the present invention.
Figure 4:
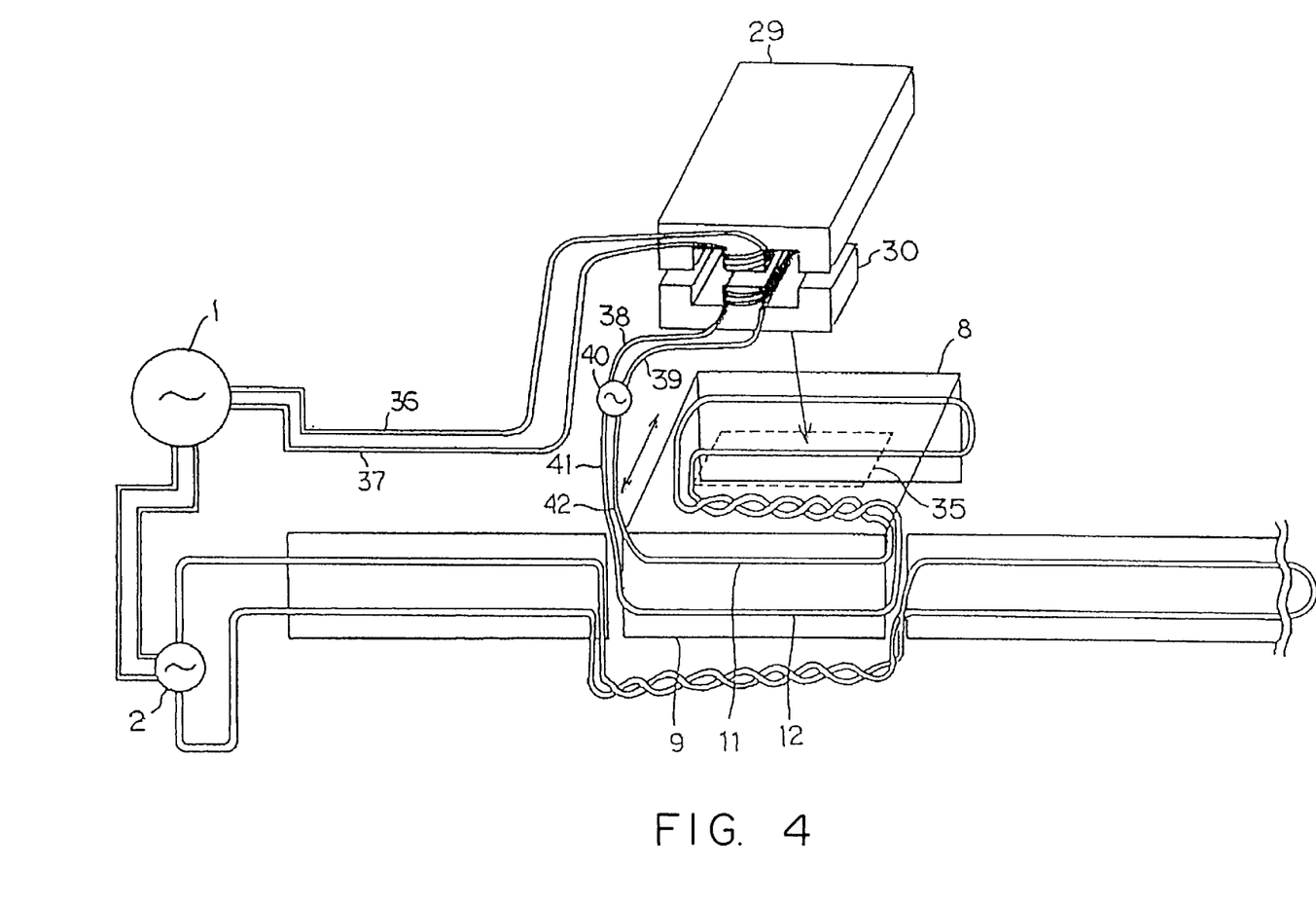
FIG. 4 discloses the overall configuration of a second alternative embodiment of the non-contact power supply system for a rail-guided vehicle according to the present invention.
Figure 5:
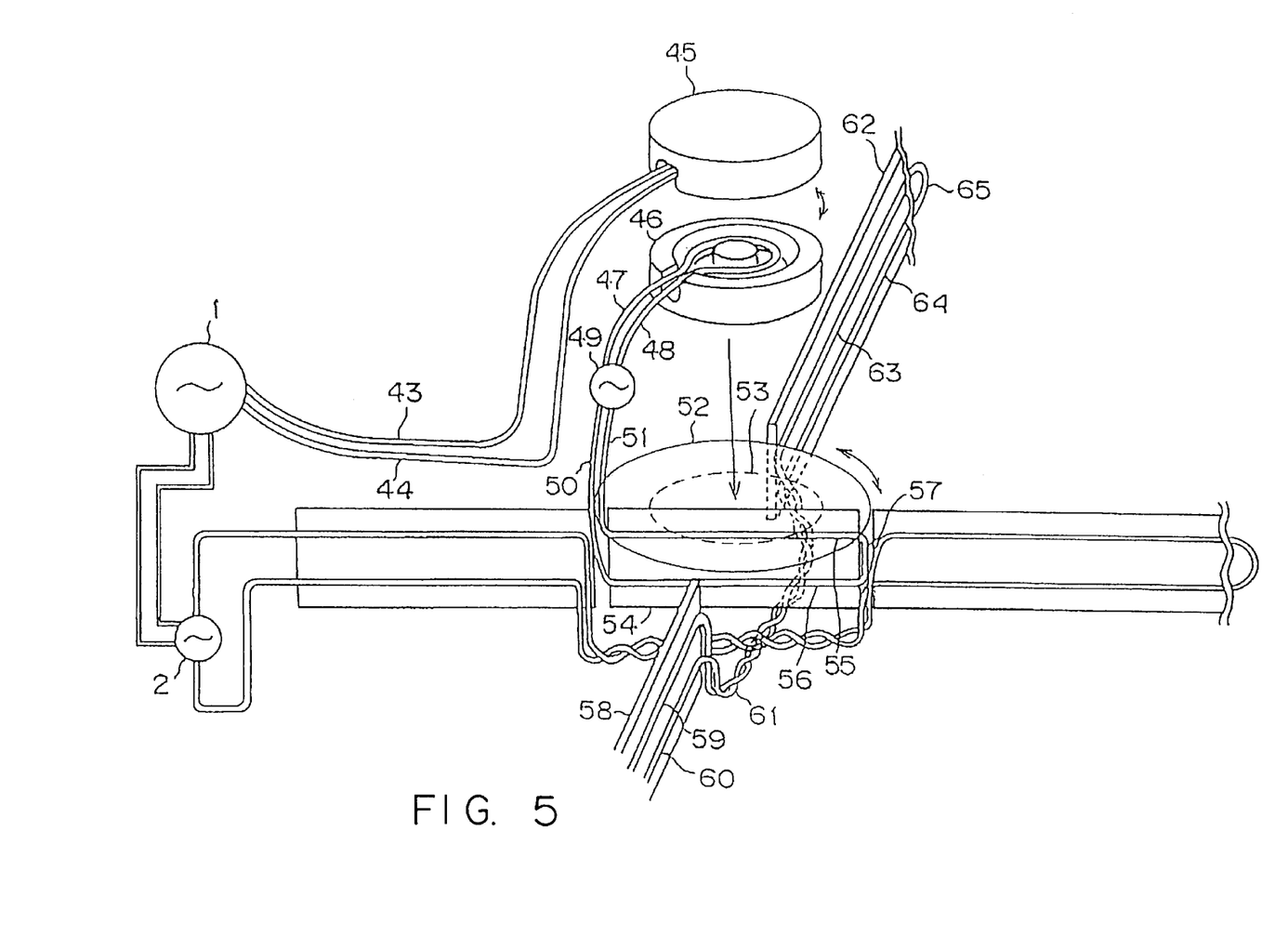
FIG. 5 discloses the overall configuration of a third alternative embodiment applying the non-contact power supply system for a rail-guided vehicle, according to the present invention, to an arrangement comprising a turntable.

Similarly, items in FIG. 3 to FIG. 5 possessed of common numbers refer to the same components and sections. Any references to overlapping descriptions are, therefore, omitted from the specification.

A commercial power source 1, a first high-frequency power supply source apparatus 2, a first fixed rail 3, feeder cables 4 and 5, a lateral table 8, first and second movable rails 9 and 10, feeder cables 11, 12, 14, and 15, a second fixed rail 18, feeder cables 19 and 20, and a short circuit line 21 are the same items as depicted in FIG. 1.

A second high-frequency power supply source apparatus 23, which is connected to the commercial power supply source 1, is added to the preferred embodiment of the present invention as disclosed in FIG. 2. The second high-frequency supply source 23 is an inverter-type power source similar to the first high-frequency power supply apparatus 2.

One end of each of the outgoing lines 24 and 25 is connected to the second high-frequency power supply apparatus 23, and the other end of each of the lines is connected to the lateral table 8 electric feed cables 11 and 12. To facilitate displacement of the lateral table 8, it is necessary to provide some degree of slackness, similar to that inherent in the transition lines 6 and 7 in the related art, but, in the present invention, with respect to only one point on each outgoing line 24 and 25.

The transition line 22, which, astride movable rail 9, connects the electric feed lines 4 and 5 for the first fixed rail 3 and the electric feed lines 19, 20 for the second fixed rail 18, is itself stationary.

A short-circuit line 26 doubles back a movable body 8 electric feed line, and is provided because of the addition of the second high-frequency power supply source apparatus 23.

A rail-guided vehicle 70 is a car, or dolly, that travels over fixed rails 3 and 18 and movable rails 9 and 10, by receiving power from electric feed cables 4 and 5, 11 and 12, 14 and 15, and 19 and 20, or while being supported from below by a wheel or wheels.

Because it remains necessary even in the present invention to allow the outgoing lines 24 and 25 to hang down, one problem that the present invention endeavors to resolve is not entirely negated. While, in the related art, the transition lines are required at both the input and output sides of the lateral table 8, in the present invention it is possible to confine the transition lines to one location. At least, then, the preferred embodiment of the present invention reduces the instances wherein the output voltage of the high-frequency power supply source apparatus 23 drops, and thus stabilizes the power output to the electric feed cables.

FIG. 3 discloses the overall configuration of the first alternative embodiment of the present invention in a non-contact electric power supply system for a rail-guided vehicle.

Connecting cables 27 and 28 are connected to the second high-frequency power supply source apparatus 23, which is connected to the commercial supply source 1. The connecting cables 27 and 28 are wound, from one turn to several turns, around the center protrusion of a core (described hereinbelow) comprising an E-shaped cross-sectional profile. By way of illustration, a single turn would be adequate for a 15–20 mm litz line having a current capacity in the order of 100 A, similar to that of an electric feed cable, and capable of being wound around the E-shaped core. If winding around a core is not feasible, however, it is possible to obtain a similar magnetic field by winding a flat net line four turns.

A detached-type transformer is formed by providing a gap between and causing to be opposed the complementary protrusions of E-shaped fixed-side 29 and movable-side 30 cores.

The fixed-side core 29 is formed from, illustratively, ferrite and silicon steel plate, bonded together, with the flat surface thereof fixed, for example, to a ceiling. A part of each of the connecting cables 27 and 28 is wound around a center protrusion disposed on the surface carrying protrusions. Each of the movable rails 9 and 10 comprises an elongated aspect with a length corresponding to the extent of the parallel displacement.

The movable-side core 30 is formed from, illustratively, ferrite and silicon steel plate, bonded together, with the flat surface thereof fixed in place at a prescribed position 35. Each of the connecting cables 33 and 34 is wound around a center protrusion disposed on the surface carrying protrusions. The moveable-side core 30 is capable of movement along the elongated aspect of the fixed-side core 29.

Ordinarily, the number of turns N1 around the fixed-side core 29 and the number of turns N2 around the movable-side core 30 are the same (N1=N2).

The connecting cables 33, 34 are connected conductively to the electric feed cables 11, 12 on the first movable rail 9 of turntable 8.

The electric feed cables 14 and 15 on the second movable rail 10 of lateral table 8 are short-circuited by means of a short-circuit line 26.

By configuring the system according to the above-described first alternative embodiment, it is possible to fix in place the lines connecting the second high-frequency supply source 23 and the lateral table 8. As a result, it is possible to stabilize power output by eliminating the incidence of output voltage reduction.

FIG. 4 discloses the overall configuration of the second alternative embodiment in the non-contact electric power supply system for a rail-guided vehicle proposed by the present invention.

The connecting cables 36 and 37 connected to the commercial supply source 1 are wound, from one turn to several turns, around the center protrusion of a core 29 (described hereinbelow) comprising an E-shaped cross-sectional profile. By way of illustration, a single turn would be adequate in the case of a 15–20 mm litz line having a current capacity on the order of 100 A, similar to that of an electric feed cable, and capable of being wound around the E-shaped core. If winding around a core is unfeasible, however, it is possible to obtain a similar magnetic field by winding a flat net line four turns.

A detached-type transformer is formed by providing a gap between and causing to be opposed the complementary protrusions of the E-shaped fixed-side 29 and movable-side 30 cores.

The fixed-side core 29 is formed from, illustratively, ferrite and silicon steel plate, bonded together, the flat surface thereof fixed in place, for example, on a ceiling. A part of each of the connecting cables 36 and 37 is wound around the center protrusion disposed in the plane carrying the protrusions.

The movable-side core 30 is formed from, illustratively, ferrite and silicon steel plates, bonded together, the flat surface thereof fixed in place at a prescribed position on the lateral table 8. Each of the connecting cables 38 and 39 is wound around the center protrusion disposed in the plane carrying the protrusions.

The connecting cables 38 and 39 are connected to a second high-frequency power supply source apparatus 40, which itself is fixed in place on the lateral table 8.

The second high-frequency power supply source apparatus 40 is connected to the electric feed cables 11 and 12, which are installed on the lateral table 8 movable rail 9 and are connected to the second high-frequency power supply source apparatus 40 by means of connecting cables 41 and 42. The second high-frequency power supply source apparatus 40 converts commercial frequency power inputted thereto to high frequency power and supplies this power to the electric feed cables 11 and 12.

By configuring the system according to the above-described second alternative embodiment, it is possible to enlarge the gap between the detached-type transformer, because the frequency of the electric current by which the transformer is joined is as low as that of the commercial frequency. If the frequency is high and the gap large, the excess current loss, for example, grows proportionately. In consequence thereof, it is unfeasible to enlarge the gap, particularly where the power source enjoys no reserve capacity. Although greater machining precision and accuracy in installation are required, a lower frequency results in a lower current loss, thus permitting a larger gap.

Because it is possible to fix in place the lines connecting the detached-type transformer and the second high-frequency power supply source apparatus 40, as well as the lines linking the high-frequency power supply source apparatus 40 and the lateral table 8, the system facilitates output stabilization by eliminating the incidence of output voltage reduction.

FIG. 5 discloses the overall configuration of the third alternative embodiment of the present invention, applying the non-contact electric power supply for a rail-guided vehicle to an arrangement comprising a turntable.

The connecting cables 43 and 44 are connected to the commercial supply source 1 and wound, from one turn to several turns, around the center protrusion of a round core (described hereinafter) comprising a center protrusion. By way of illustration, a single turn would be adequate in the case of a 15–20 mm litz line having a current capacity in the order of 100 A, similar to that of an electric feed cable, and capable of being wound around an E-shaped core (explained hereinafter). Where winding around a core is not feasible, however, an equivalent magnetic field can be obtained by winding four turns of a flat net line having a current capacity in the order of 20 A.

A detached-type transformer (rotary transformer) is formed by providing a gap between and causing to be opposed the complementary protrusions of the round fixed-side 45 and movable-side 46 cores, each comprising a central protrusion.

The fixed-side core 45 consists of, illustratively, ferrite and silicon steel plates, bonded together, the flat surface thereof fixed in place, for example, on a ceiling. A part of each of the connecting cables 43 and 44 is wound around the centermost protrusion disposed in the plane carrying the protrusions.

The movable-side core 46 is a core consisting of, illustratively, ferrite and silicon steel plates, bonded together, the flat surface thereof fixed in place at a position 53 on the turntable 52, representing the position at which the center of the round detached-type transformer (comprising the fixed-side core 45 and movable-side core 46) on the turntable 52 coincides with the rotational center of the turntable 52. Each of the connecting cables 47, 48 is wound around the centermost protrusion disposed in the plane carrying the protrusions.

The connecting cables 47 and 48 are connected to the second high-frequency power supply apparatus 49, which is itself fixed in place on the turntable 52.

The second high-frequency power supply apparatus 49 is connected to the electric feed cables 55 and 56, which are fixed on the movable rail 54 on turntable 52 by means of the connecting cables 50 and 51. Further, the other ends of the electric feed cables 55 and 56 are short-circuited by the short circuit line 57.

The electric feed cables 59 and 60 are fixed on the third fixed rail 58 and are connected to a high-frequency power supply apparatus not depicted in the drawing. The electric feed cables 63 and 64 are fixed on the fourth fixed rail 62. The electric feed cables 63 and 64 are short-circuited by the short circuit line 65. The electric feed cable 59 is connected to the electric feed cable 63, and the electric feed cable 60 connected to the electric feed cable 64, by a transition line 61. The transition line 61 is also fixed in place.

By configuring the system according to the above-described third alternative embodiment, which utilizes a detached-type transformer (rotary transformer), the present invention may be realized not only in instances wherein a lateral table undergoes parallel displacement, but also where a turntable causes a rail-guided vehicle to rotate.

As in the second alternative embodiment, in the third alternative embodiment, too, it is possible to enlarge the gap between detached-type transformers, because the frequency of the connecting current is as low as that of the commercial supply source.

Further, because it is possible to fix in place the lines connecting the detached-type transformer and the second high-frequency power supply apparatus, as well as the lines connecting the high-frequency power supply 49 and the turntable 52, the present invention eliminates the incidence of output voltage reduction, thus achieving a stabilized output.

It is to be noted that the non-contact electric power supply system for a rail-guided vehicle, as disclosed in the foregoing illustrative embodiments, is not limited to a ceiling installation. Rather, the present invention also contemplates application of the system to instances in which rails are laid on a floor.

With respect to the embodiments comprising a lateral table, the foregoing specification explains only situations wherein the system undergoes parallel displacement in a horizontal plane. The present invention further contemplates, however, a lateral table capable of parallel displacement to more than three positions, as well as a lateral table by means of which the rails undergo parallel displacement, illustratively, between two vertical levels.

Further, with respect to embodiments comprising a turntable, the specification discloses only a four-directional turntable. It is to be noted, however, that the present invention can be applied, illustratively, to eight- and twelve-direction multi-directional turntables, as well.

A non-contact electric power supply system comprising movable rails, as contemplated by the present invention, makes it possible to reduce the output reduction attributable to changes in inductance according to the displacement of the transition lines between the fixed and movable rails. Consequently, it is unnecessary to boost the capacity of the high-frequency electrical current according to the amount of the change in inductance, and electric feed voltage deficits for a rail-guided vehicle are eliminated.

What is claimed is:

1. A non-contact electric power supply system for a rail-guided vehicle, comprising:
    a main line comprising fixed rails for guiding the vehicle;
    a movable rail body for changing the course of the vehicle moving along the main line;
    a first high frequency power supply apparatus;
    a first electric feed line for supplying electric power from the first high frequency power supply apparatus to the main line;
    a second high frequency power supply apparatus; and
    a second electric feed line for supplying electronic power from the second high frequency power supply apparatus to the movable rail body;
    wherein portions of the second electric feed line for the movable rail body are fixed in place.

2. The non-contact electric power supply system for a rail-guided vehicle according to claim 1, further comprising:
    a transformer along the second electric feed line, between the second high-frequency power supply apparatus and the movable rail body, the transformer comprising a fixed-side core, wherein a portion of the second electric feed line from the second high-frequency power supply apparatus is wound around the fixed-side core, and a movable-side core, wherein a portion of the second electric feed line from the movable rail body is wound around the movable-side core, the movable-side core being capable of relative movement with respect to the fixed-side core while maintaining a fixed distance from the fixed-side core;
    the fixed-side core of the transformer adapted to be secured to an immovable structure; and
    the movable-side core adapted to be secured to the movable rail body.

3. The non-contact electric power supply system for a rail-guided vehicle according to claim 2, wherein
    the portion of the second electric feed line from the movable rail body is wound around a respective one of the cores of the transformer, a plurality of turns.

4. The non-contact electric power supply system for a rail-guided vehicle according to claim 2, wherein:

said fixed-side core has an E-shaped cross-sectional profile including three protrusions and said movable-side core has an E-shaped cross-sectional profile including three protrusions, wherein the protrusions of the fixed-side core face the protrusions of the movable-side core with a gap therebetween and the portion of the second electric feed line from the movable rail body is wound around a central protrusion of a respective one of the cores;

the fixed-side core comprising an elongated dimension having a length corresponding to an extent of displacement of the moveable rail body; and the movable-side core being capable of displacement along the elongated dimension thereof.

5. The non-contact electric power supply system for a rail-guided vehicle according to claim 2, wherein the immovable structure is a building.

6. The non-contact electric power supply system for a rail-guided vehicle according to claim 1, further comprising:

a transformer along an electric feed line between a commercial power source and the second high frequency power supply apparatus, the transformer comprising a fixed-side core, wherein the electric feed line from the commercial power source is wound around the fixed-side core, and a movable-side core, wherein an electric feed line from said second high-frequency power supply apparatus is wound around the movable side core, the movable-side core being capable of relative movement with respect to the fixed-side core while maintaining a fixed distance from the fixed-side core;

the fixed-side core of the transformer adapted to be secured to an immovable physical structure;

the movable-side core of the transformer adapted to be secured to the movable rail body; and the second high-frequency power supply apparatus acted to be secured to the movable rail body.

7. The non-contact electric power supply system for a rail-guided vehicle according to claim 6, wherein:

said fixed side core is a circular concave fixed-side core comprising protrusions at a center and a perimeter thereof, and said movable side core is a circular concave movable-side core comprising protrusions at a center and a perimeter thereof, wherein the protrusions of the fixed-side core face the protrusions of the movable-side core, wherein said electric feed line from said second high-frequency power apparatus is wound around the center protrusion of a respective one of the cores;

the transformer being capable of rotating so that central rotational axes of the fixed-side core and the movable-side core coincide.

8. The non-contact electric power supply system for a rail-guided vehicle according to claim 1, wherein said movable rail body is a lateral table displaceable horizontally or vertically in a straight line parallel to a guiding surface of a rail.

9. The non-contact electric power supply system for a rail-guided vehicle according to claim 1, wherein the movable rail body comprises a turntable displaceable rotationally to a guiding surface of the movable rail body.

10. The non-contact electric power supply system for a rail-guided vehicle according to claim 6, wherein the immovable structure is a building.

11. A non-contact electric power supply system for a rail-guided vehicle, comprising:

a main line comprising fixed rails for guiding the vehicle;

a movable rail body for changing the course of the vehicle moving along the main line;

an electric feed line for supplying electric power to the main line;

a first high frequency power supply apparatus connected to the electric feed line and for supplying electric power to the main line; and a second high frequency power supply apparatus, separate from the first high frequency power supply apparatus, for supplying electric power to the movable rail body.

12. The non-contact electric power supply system for a rail-guided vehicle according to claim 11, further comprising:

a transformer along a second electric feed line, connected between the second high-frequency power supply apparatus and the movable rail body, the transformer comprising a fixed-side core, wherein a portion of the second electric feed line from the second high-frequency power supply apparatus is wound around the fixed-side core, and a movable-side core, wherein a portion of the second electric feed line from the movable rail body is wound around the movable-side core, the movable side core being capable of relative movement with respect to the fixed-side core while maintaining a fixed distance from the fixed-side core;

wherein the fixed-side core of the transformer is adapted to be secured to an immovable structure; and the movable-side core of the transformer is adapted to be secured to the movable rail body.

13. The non-contact electric power supply system for a rail-guided vehicle according to claim 12, wherein:

the second electric feed line is wound around respective cores of the transformer, a plurality of turns.

14. The non-contact electric power supply system for a rail-guided vehicle according to claim 11, further comprising:

a transformer along an electric feed line between a commercial power source and the second high frequency power supply apparatus, the transformer comprising:

a fixed-side core, wherein an electric feed line from the commercial power source is wound around the fixed-side core, the fixed-side core adapted to be secured to an immovable physical structure; and a movable-side core, wherein an electric feed line from the second high-frequency power supply apparatus is wound around the movable-side core, the movable-side core being capable of relative movement with respect to the fixed-side core while maintaining a fixed distance from the fixed-side core, the movable-side core adapted to be secured to the movable rail body; and wherein the second high-frequency power supply apparatus is adapted to be secured to the movable rail body.

15. The non-contact electric power supply system for a rail-guided vehicle according to claim 11, wherein;

said movable rail body is a lateral table displaceable horizontally or vertically in a straight line.

16. The non-contact electric power supply system for a rail-guided vehicle according to claim 15, further comprising:

a transformer including a fixed-side core with an E-shaped cross-sectional profile including three protrusions and a movable-side core with an E-shaped cross-sectional profile including three protrusions, where the protrusions of the fixed-side core face the protrusions of the movable-side core with a gap therebetween, and a electric feed line for the movable rail body is wound around central protrusions of the respective ones of the cores;

the fixed-side core comprising an elongated dimension having a length corresponding to an extent of displacement of the lateral table; and the movable-side core being capable of displacement along the elongated dimension of the fixed-side core.

17. The non-contact electric power supply system for a rail-guided vehicle according to claim 11, wherein:

the movable rail body comprises a turntable displaceable rotationally.

18. The non-contact electric power supply system for a rail-guided vehicle according to claim 17, further comprising:

a transformer including a circular concave fixed-side core comprising protrusions at a center and a perimeter thereof, and a circular concave movable-side core comprising protrusions at a center and a perimeter thereof;

the protrusions of the fixed-side core face the protrusions of the movable-side core;

an electric feed line for the turntable of the movable rail body is wound around the center protrusions of respective ones of the cores; and the transformer is capable of rotating so that central rotational axes of the fixed-side core and the movable-side core coincide.

* * * * *